W. W. GOODWIN.
Gas-Light and Pressure Indicator.
No. 6,254. Reissued Jan. 26, 1875.
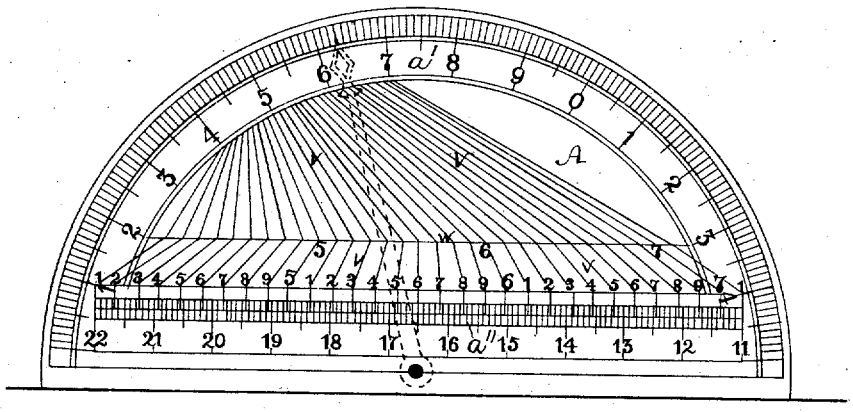
Witnesses:
S. Lewis Jones.
H. D. Wagner.
Inventor:
William W. Goodwin
THE GRAPHIC CO. PHOTO-LITH. 39 & 41 PARK PLACE, N.Y.

UNITED STATES PATENT OFFICE.

WILLIAM W. GOODWIN, OF PHILADELPHIA, PENNSYLVANIA.

IMPROVEMENT IN GAS LIGHT AND PRESSURE INDICATORS.

Specification forming part of Letters Patent No. 138,016, dated April 22, 1873; reissue No. 6,254, dated January 26, 1875; application filed November 18, 1874.

*To all whom it may concern:*

Be it known that I, WILLIAM W. GOODWIN, of the city of Philadelphia, in the State of Pennsylvania, have invented an Improvement in Jet-Photometers, of which the following is a specification:

The object of my invention is to dispense with the use of the separate diagram or chart heretofore required to be resorted to in finding the candle-power of any illuminating-gas burning in a jet-photometer, especially in the jet-photometer of Lowe as improved by Kirkham and Sugg; and this I accomplish by the combination of a candle-power scale with the jet-photometer in such a manner that, in testing the quality of any illuminating-gas burning in the same, the candle-power of the gas—say, from eleven to twenty-two candles—will be immediately and distinctly indicated by the index bar or pointer of the photometer, as will be fully, clearly, and exactly set forth and described herein, with reference to the accompanying drawing, which is a face or front view of the ordinary dial-plate embodying my said invention.

A is a semicircular plate, having the arched pressure-scale $a'$ engraved thereon, and numbered in the ordinary manner, to be pointed to by the usual moving index-bar, indicated by the dotted lines. The candle-power scale $a''$ is engraved along on the face of, and parallel with, the lower or straight edge of the plate A, and divided off in equal spaces, numbered from 11 at the right hand to 22 at the left hand—the lowest and highest candle-power required to be known in testing illuminating-gases. Each of these spaces is divided into halves, and each half into fifths, to indicate fractions of a candle. Now, as the range of pressure to support a jet-flame seven inches high in the jet-photometer is only from .41 to .71, as indicated by the pressure-scale $a'$ in the drawing, and, as the short range in its divisions and subdivisions must be connected with the candle-power scale $a''$ and its corresponding divisions and subdivisions from 11 to 22, to indicate the candle-power of the gas corresponding with any particular pressure, the series of straight radial lines $v$ $v$ are engraved on the face of the dial-plate to extend from the pressure-scale $a'$ to the horizontal line $w$, and from thence obliquely to the corresponding division and subdivision lines on the candle-power scale $a''$, as shown in the drawing. The change in the radial direction of the lines $v$ $v$, at the horizontal line $w$, is for the purpose of giving a more distinctly visible connection with the respective vertical division-lines on the scale $a''$. The intermediate horizontal line $x$, shown on the candle-scale $a''$, is divided from left to right into tenths, and numbered as shown in the drawing, for the purpose of enabling the inspector to more readily see the subdivisions on the said candle-power scale, which correspond with those on the curved pressure-scale $a'$.

As it is known that the theory of Kirkham and Sugg is correct—*i. e.*, "maintaining a seven-inch flame from an orifice of certain fixed dimensions, the illuminating power of gas is in direct proportion inversely as the pressure"—it will be seen that my candle-power scale $a''$ is constructed and applied in accordance therewith, viz: If the index-bar point at .71 the candle-power of the gas will be shown to be eleven candles; if it point at .41 the candle-power of the gas will be shown to be twenty-two candles, and so for any intermediate pressure.

By calculation I have found that 11-candle power corresponds with .03 pressure, and hence, the value in pressure required to give one-tenth of a candle is .0027+ of an inch; and, if the question be asked, for instance, "What pressure is required to give 21.3 candles?" the answer will be shown on the scale $a''$ to be .4291 exactly, or, approximately, .43; and it can be seen and read off in a moment, whereas, by the resort to Kirkham and Sugg's chart, as heretofore, the answer could not be found as quickly.

It will, therefore, be readily understood without further explanation, that whatever pressure the index-bar may point out on the scale $a'$, the number of candles indicative of the illuminating power of the gas which may be burning a seven-inch flame in the photometer will be seen by a momentary inspection of the scale $a''$.

I claim as my invention—

The combination, with a jet-photometer, provided with an indicator of the variable pressure on the gas, of a candle-power scale, whereby the number indicating the candle-power of the gas burning under the pressure, shown at the time by the said pressure-indicator, will be pointed out on the candle-scale by the index bar or pointer, substantially as and for the purpose hereinbefore set forth.

WILLIAM W. GOODWIN.

Witnesses:
S. LEWIS JONES,
H. D. WAGNER.